United States Patent [19]
Gill et al.

[11] Patent Number: 5,828,530
[45] Date of Patent: *Oct. 27, 1998

[54] ORTHOGONAL SPIN VALVE SENSOR WITH REDUCED NET FIELD

[75] Inventors: Hardayal Singh Gill, Portola Valley; Bruce A. Gurney, Santa Clara; Joseph Francis Smyth, Los Altos; Virgil Simon Speriosu, San Jose; Douglas Johnson Werner, Fremont, all of Calif.

[73] Assignee: International Business Machines Corporation, Armonk, N.Y.

[ * ] Notice: The term of this patent shall not extend beyond the expiration date of Pat. No. 5,696,656.

[21] Appl. No.: 857,425

[22] Filed: May 16, 1997

Related U.S. Application Data

[63] Continuation of Ser. No. 709,549, Sep. 6, 1996, Pat. No. 5,696,656.

[51] Int. Cl.$^6$ ........................................... G11B 5/39
[52] U.S. Cl. ................................................. 360/113
[58] Field of Search ......................... 360/113; 338/32 R; 324/252

[56] References Cited

U.S. PATENT DOCUMENTS

| | | | |
|---|---|---|---|
| 3,940,797 | 2/1976 | Brock et al. | 360/113 |
| 4,803,580 | 2/1989 | Mowry | 360/113 |
| 4,841,398 | 6/1989 | Mowry | 360/113 |
| 5,079,662 | 1/1992 | Kawakami et al. | 360/113 |
| 5,258,883 | 11/1993 | Ruigrok | 360/113 |
| 5,287,238 | 2/1994 | Baumgart et al. | 360/113 |
| 5,408,377 | 4/1995 | Gurney et al. | 360/113 |
| 5,546,254 | 8/1996 | Gill | 360/113 |
| 5,638,235 | 6/1997 | Gill et al. | 360/113 |
| 5,666,246 | 9/1997 | Gill et al. | 360/113 |
| 5,696,656 | 12/1997 | Gill et al. | 360/113 |

*Primary Examiner*—Robert S. Tupper
*Attorney, Agent, or Firm*—Gray Cary Ware Freidenrich

[57] ABSTRACT

An orthogonal spin valve read head is provided wherein a spin valve sensor is asymmetrically located between first and second shield layers so that image currents in the first and second shield layers produce a resultant image field which partially or completely counterbalances a stiffening field from antiferromagnetic, pinned and spacer layers in the MR sensor when sense current is conducted therethrough. Accordingly, the spin valve sensor may be located a greater distance from the second shield layer by providing a mid-gap layer between the spin valve sensor and a second gap layer. In one example, the total thickness of the mid-gap and second gap layer is four times as thick as the first gap layer which results in the image fields from the first and second shield layers completely counterbalancing the field from the antiferromagnetic, pinned and spacer layers due to the sense current.

11 Claims, 6 Drawing Sheets

($H_{FC}$)

($H_{demag}$)

ORTHOGONAL SPIN VALVE SENSOR WITH REDUCED NET FIELD

CROSS REFERENCE TO RELATED APPLICATION

This application is a continuation of application Ser. No. 08/709,549 filed Sep. 6, 1996 now U.S. Pat. No. 5,696,656.

BACKGROUND OF THE INVENTION

1. Field of the Invention

The present invention relates to an orthogonal spin valve read head and more particularly to an orthogonal spin valve read head wherein the magnetic moment stiffness of a spin valve sensor caused by sense current is reduced or eliminated.

2. Description of the Related Art

Spin valve technology is a well-known supplement to magnetoresistive (MR) sensor (or head) technology that advantageously utilizes the spin-dependent transmission of conduction electrons through a non-magnetic layer that is disposed between the magnetic layers of a layered MR sensor. A current-biased MR sensor of the spin valve type is described, for example, in U.S. Pat. No. 5,301,079, assigned to the assignee of this application, and incorporated herein by reference. In the '079 patent, spin valve structures are mentioned that include two layers of magnetic material ("magnetic layers") between which is disposed a layer of non-magnetic material. The direction of magnetization of one magnetic layer is "pinned" or constrained to a preselected orientation and the easy axis of the magnetic moment in the other magnetic layer (the "free layer") is perpendicular to the orientation of the one layer under non-signal conditions. Typically, pinning in a spin valve sensor is provided by exchange coupling to a layer of antiferromagnetic material ("antiferromagnetic layer").

A spin valve read head employs a spin valve sensor sandwiched between first and second gap layers that are, in turn, sandwiched between first and second shield layers. An orthogonal spin valve read head has a first lead connected to the spin valve sensor along an air bearing surface (ABS) and a second lead layer connected to the spin valve sensor at a recessed location within the head. Accordingly, a sense current is conducted through the spin valve sensor in a direction which is perpendicular to the ABS. The leads conduct a sense current through the spin valve sensor. Typically, a spin valve read head is combined with an inductive write head to form a combined head. A combined head may have the structure of either a merged spin valve head, or a piggyback spin valve head. In a merged spin valve head the second shield layer serves as a shield for the read head and as a first pole piece for the write head. A piggyback spin valve head has a separate layer which serves as the first pole piece for the write head.

In a magnetic disk drive a combined head is supported adjacent a rotating disk to write or read information on the disk. Information is written to the rotating disk by magnetic fields which fringe across a gap between first and second pole pieces of the write head. The resistance of the spin valve read head sensor changes proportionally to the magnitudes of the magnetic fields. When the sense current is conducted through the spin valve sensor the resistance changes cause potential changes that are detected and processed as playback signals.

The spin valve sensor is a multi-layered element in which a pinned layer has its magnetic moment oriented by an adjacent antiferromagnetic layer, and a free layer has a magnetic moment that is free to rotate under the influence of magnetic fields from the rotating disk. The free and pinned layers are separated by a spacer layer of conductive material, such as copper. The sense current is conducted through the free, spacer and pinned layers of the sensor. Relative rotation of the magnetic moments of the free and pinned layers changes the resistance presented to the sense current circuit, resulting in a change of potential across the sensor.

In a typical spin valve MR sensor, the free and pinned layers have equal thicknesses and the spacer layer is one half as thick as either of the free or pinned layers. An exemplary thickness of each of the free and pinned layers is 50 Å and an exemplary thickness of the spacer layer is 25 Å. In an orthogonal spin valve sensor the free layer is provided with an easy axis which is parallel to the ABS. In order to stabilize the magnetic domains along this axis, hard bias layers are provided adjacent the sides of the free layer. Accordingly, the magnetic moment of the free layer is aligned and stabilized along its easy axis so that when it is rotated by magnetic fields the relative rotation (angle) between the magnetic moments of the free and pinned layers determines the resistance of the spin valve sensor.

However, when sense current is conducted through the pinned and spacer layers it causes magnetic fields to traverse the free layer, which "stiffens" the magnetic moment of the free layer. This lowers the dynamic range of the spin valve sensor and degrades its sensitivity. Manifestly, elimination or minimization of the effect of these fields will improve the performance of a spin valve sensor.

SUMMARY OF THE INVENTION

We have found that, by asymmetrically locating the spin valve sensor between the first and second shield layers of a combined MR head, fields induced into the free layer by the pinned and spacer layers can be counterbalanced by image fields from the shield layers so that the magnetic moment of the spin valve sensor is not stiffened when the sense current is conducted therethrough. When the sense current is conducted through the spin valve sensor an image current, is induced into each shield layer because of the magnetic coupling therebetween. The image current in each shield layer causes a respective image field about the shield layer. When the thicknesses of the pinned and free layers are equal and the thickness of the spacer layer is one-half the thickness of either of the pinned or free layers, the sense current fields caused by the pinned and spacer layers can be substantially counterbalanced by the image fields from the shield layers when the spin valve sensor is located four times as far from the second shield layer as it is located from the first shield layer. With this arrangement an image current in the first shield layer is stronger than an image current in the second shield layer. Accordingly, an image field induced into the free layer from the image current in the first shield layer is stronger than an image field induced into the free layer from the image current in the second shield layer. Since these image fields are of opposite polarity there will be a net image field. The net image field is opposite in polarity to the fields induced into the free layer by the pinned and spacer layers. By proper asymmetrical spacing of the spin valve sensor between the first and second shield layers, the net image field counterbalances the fields from the pinned and spacer layers. With this arrangement the fields from the pinned and spacer layers caused by the sense current do not stiffen the magnetic moment of the free layer. This results in a more sensitive spin valve sensor with greater dynamic range.

An object of the present invention is to provide an orthogonal spin valve read head wherein the magnetic moment of the free layer is not stiffened by fields from the pinned and spacer layers when a sense current is conducted therethrough.

Another object is to provide an orthogonal spin valve read head which has improved sensitivity and dynamic range.

A further object is to provide an orthogonal spin valve read head wherein the spin valve sensor is asymmetrically located between shield layers of the head so as to substantially counterbalance fields from the pinned and spacer layers when a sense current is conducted therethrough.

Other objects and advantages of the present invention will become apparent upon reading the following description taken together with the accompanying drawings.

DETAILED DESCRIPTION OF THE PREFERRED EMBODIMENTS

Figure 1:
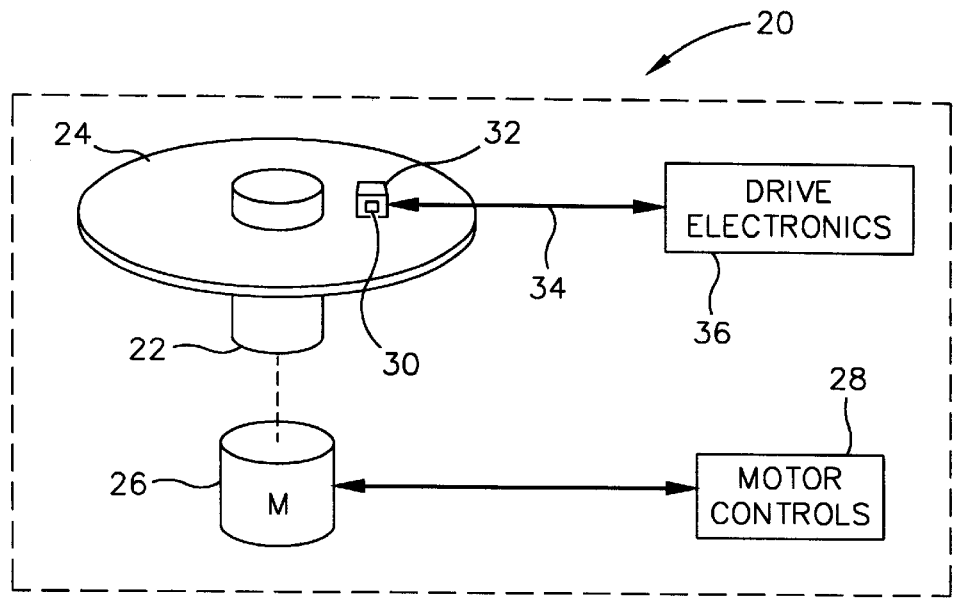
FIG. 1 is an isometric schematic illustration of a magnetic disk drive which employs an exemplary merged orthogonal spin valve head with an improved spin valve sensor.

Referring now to the drawings wherein like reference numerals designate like or similar parts throughout the several views, there is illustrated in FIG. 1 a disk drive 20. The drive 20 includes a spindle 22 which supports and rotates at least one magnetic disk 24. The spindle 22 is rotated by a motor 26 which is governed by motor control 28. A thin film spin valve magnetic head 30 of the present invention is mounted on a slider 32, the slider being supported by a suspension and actuator arm 34. The suspension and actuator arm 34 position the slider 32 so that the head 30 is in a transducing relationship with a surface of the magnetic disk 24. When the disk 24 is rotated by the motor 26, air is moved by the surface of the disk, causing the slider to ride slightly off of the surface on an air bearing with the thickness on the order of 0.075 microns. The head 30 is then employed for writing information to one or more circular tracks on the surface of the disk 24 as well as reading information therefrom. Information-bearing signals, as well as servo signals for moving the slider to various tracks, are processed by drive electronics 36.

Figure 2:
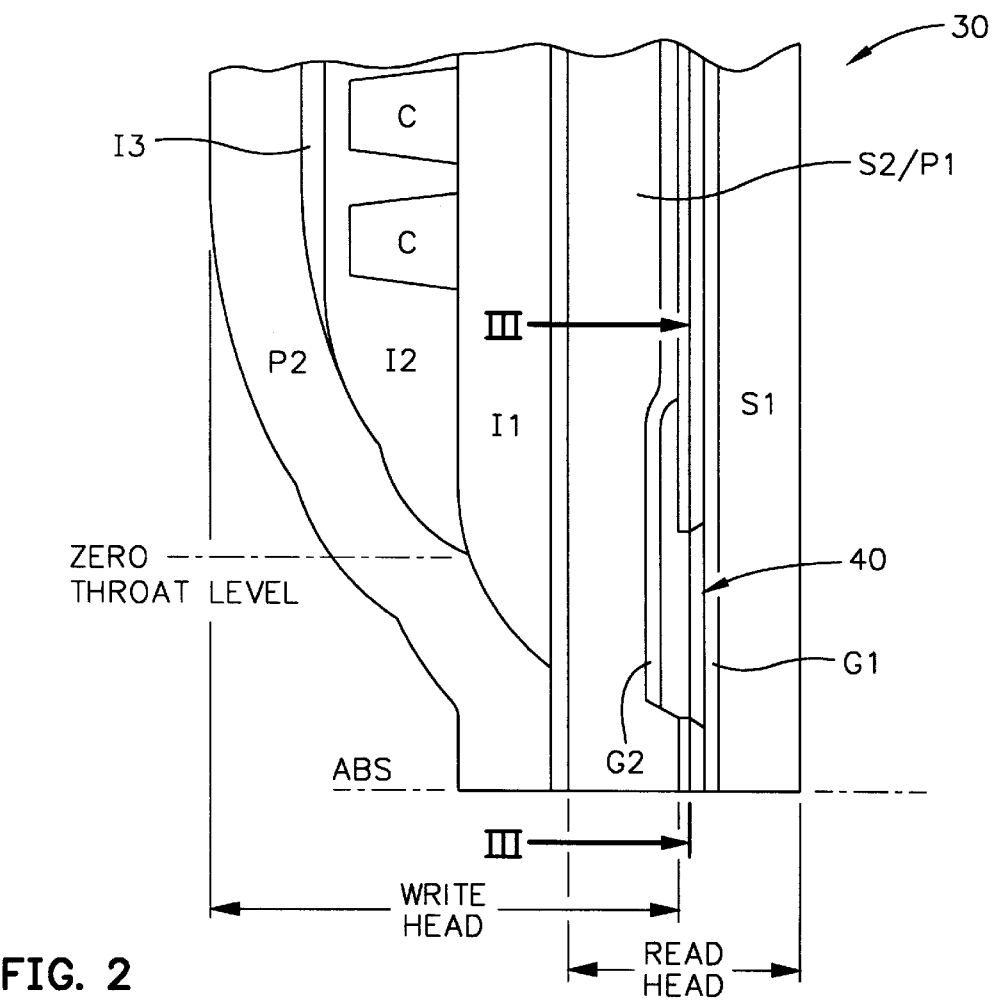
FIG. 2 is a schematic vertical cross-sectional view of the exemplary merged orthogonal spin valve head with the improved spin valve sensor.

FIG. 2 is a cross-sectional schematic illustration of the head 30 which includes a read head portion and a write head portion. The head 30 is lapped to form an air bearing surface (ABS), the ABS being spaced from the surface of the rotating disk by the air bearing as discussed hereinabove. The read head portion includes an orthogonal spin valve sensor 40 sandwiched between first and second gap layers G1 and G2 which are, in turn, sandwiched between first and second shield layers S1 and S2. The write head portion includes a coil layer C and insulation layer I2 which are sandwiched between insulation layers I1 and I3 which are, in turn, sandwiched between first and second pole pieces P1 and P2. A gap layer G3 is sandwiched between the first and second pole pieces at their pole tips adjacent the ABS for providing a magnetic gap. When signal current is conducted through the coil layer C, flux is induced into the first and second pole layers P1 and P2 causing flux to fringe across the pole tips at the ABS. This flux magnetizes one or more circular tracks on the rotating disk 24, shown in FIG. 1, during a write operation. During a read operation, flux from magnetized regions on the rotating disk bathes the MR sensor of the read head, causing resistance changes in the sensor. These resistance changes are detected by detecting potential changes across the sensor. The potential changes are processed, as readback signals, by the drive electronics 36 shown in FIG. 1. The combined head illustrated in FIG. 2 is a "merged" spin valve head in which the second shield layer S2 of the read head is employed as a first pole piece P1 for the write head. In a piggyback head (not shown) the second shield layer S2 and the first pole piece P1 are separate layers.

Figure 3:
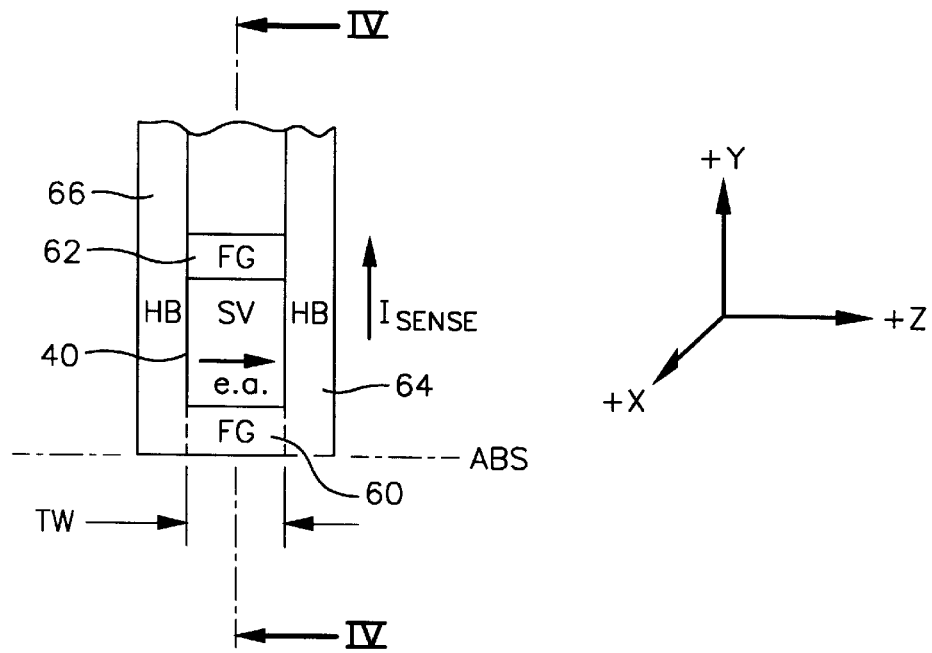
FIG. 3 is a cross-sectional view taken along plane III—III of FIG. 2.

FIG. 3 shows a plan view of the spin valve 40 with bottom and top flux guides 60 and 62 contiguously connected to the bottom and top edges of the spin valve sensor 40, the bottom flux guide 60 being exposed at an air bearing surface (ABS) and the top flux guide 62 being recessed within the head. In an alternative embodiment the flux guides 60 and 62 may be omitted wherein the bottom edge of the spin value is exposed at the ABS. First and second hard bias (HB) layers 64 and 66 may be located contiguously to first and second side edges of the spin valve. The hard bias layers 64 and 66 may also be connected contiguously to edges of the spin valve 40 with the bottom and top flux guides 60 and 62 so as to planarize the bottom and top portions adjacent the bottom and top ends of the spin valve sensor for the connection of first and second leads to the spin valve sensor which will be explained hereinbelow.

Figure 4:
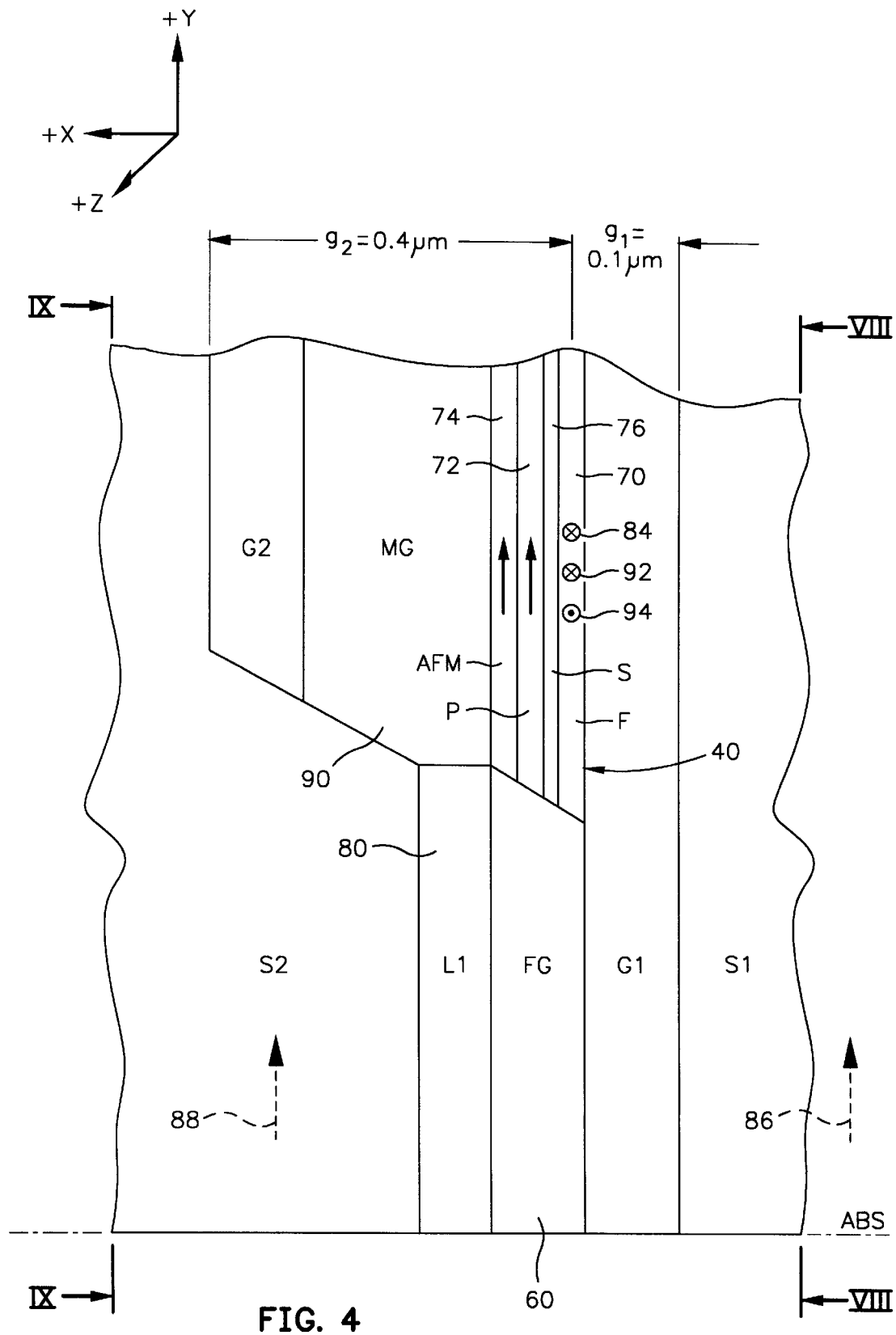
FIG. 4 is an enlarged cross-sectional vertical view of the spin valve read head.

As shown in FIG. 4, the spin valve sensor 40 includes a free layer 70 which has its easy axis set parallel to the ABS. This means that in a quiescent state (without flux from the disk) the magnetic moment of the free layer is oriented parallel to the ABS. The spin valve sensor 40 also includes a pinned layer 72 which abuts an anti-ferromagnetic (AFM) layer 74, the AFM layer constraining the magnetic moment of the pinned layer to a direction which is perpendicular to the ABS. The spin valve sensor 40 further includes an electrically-conducting non-magnetic spacer layer 76 disposed between the free and pinned layers 70 and 72. Materials for the free and pinned layers 70 and 72 may be Permalloy (NiFe) and cobalt (Co) respectively. The spacer layer 76 may be copper (Cu) and the AFM layer 74 may be iron manganese (FeMn). The hard bias layers 64 and 66 shown in FIG. 3 may be cobalt-platinum-chromium (CoPtCr). The aforementioned spin valve layers 70, 72, 74 and 76 may be sandwiched between a bottom seedlayer (bottom in the process of making) and a top protective layer, both of which may be tantalum (Ta). These layers are not shown in the drawing. An exemplary spin valve sensor may comprise 50 Å of Ta as a seed-layer, 45 Å to 80 Å of NiFe as a free layer, 25 Å of Cu as a spacer layer, 26 Å of Co as a pinned layer, 150 Å of FeMn as an AFM layer and 50 Å of Ta as a top protective layer.

Figure 10:
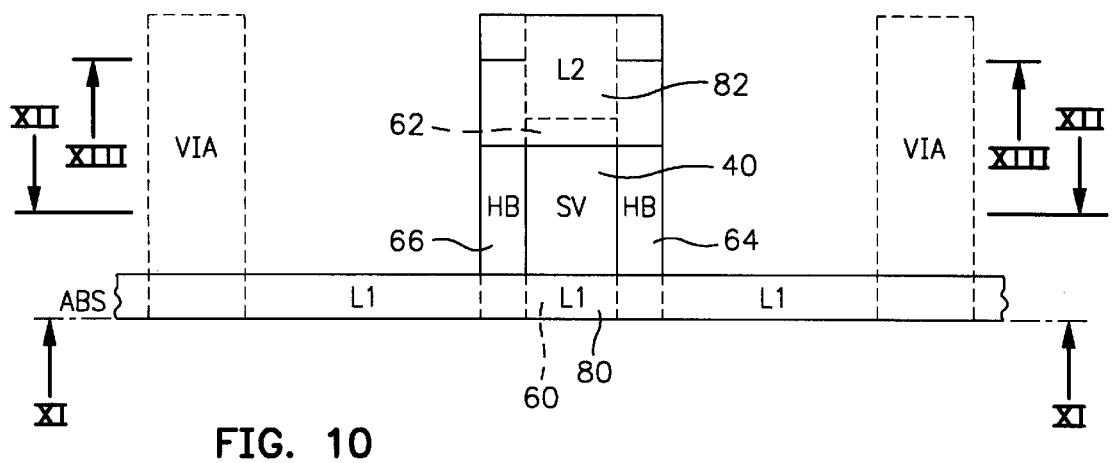
FIG. 10 is a plan view of the spin valve sensor and adjacent components similar to FIG. 3.
Figure 11:
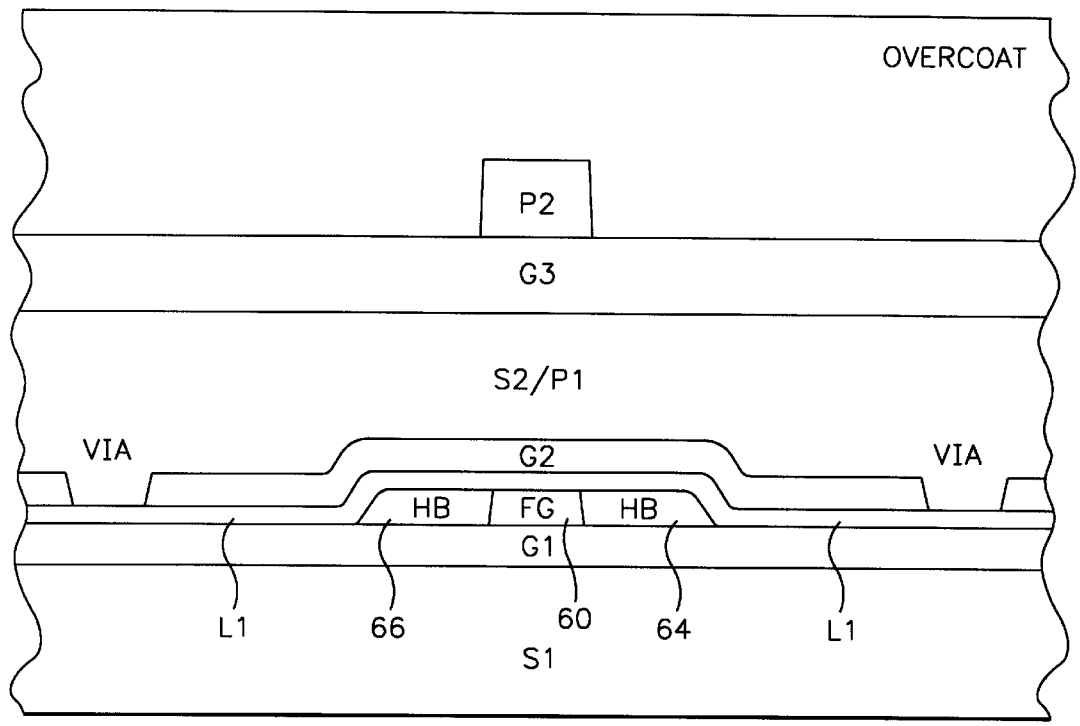
FIG. 11 is a view taken along plane XI—XI of FIG. 10.
Figure 12:
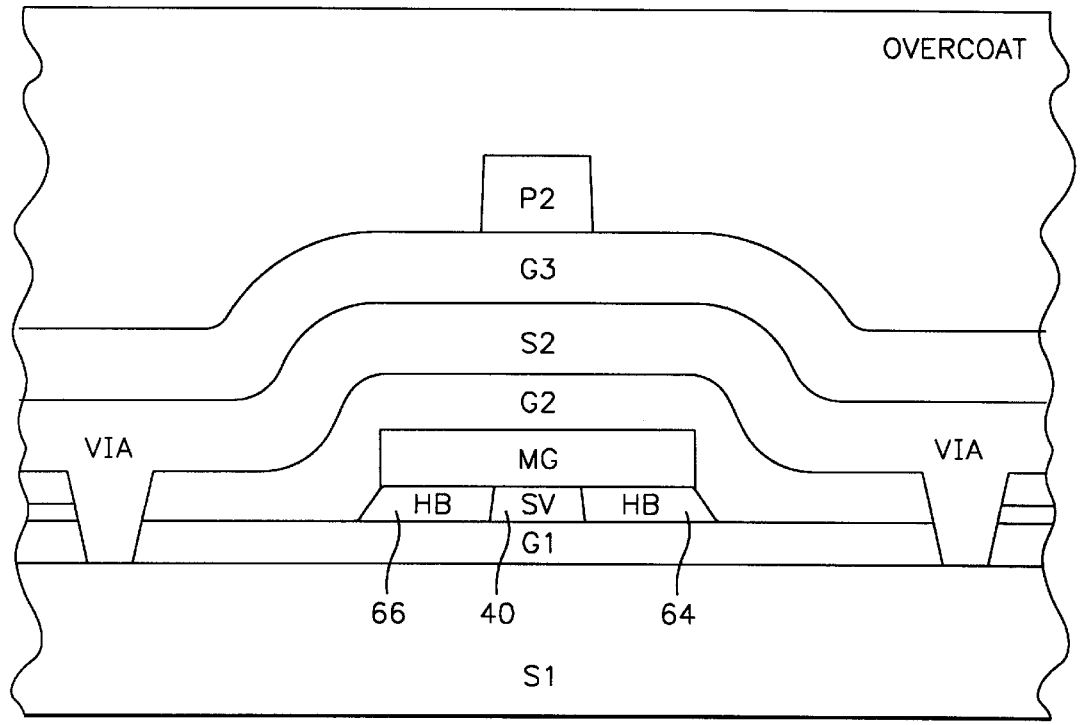
FIG. 12 is a view taken along plane XII—XII of FIG. 10.
Figure 13:
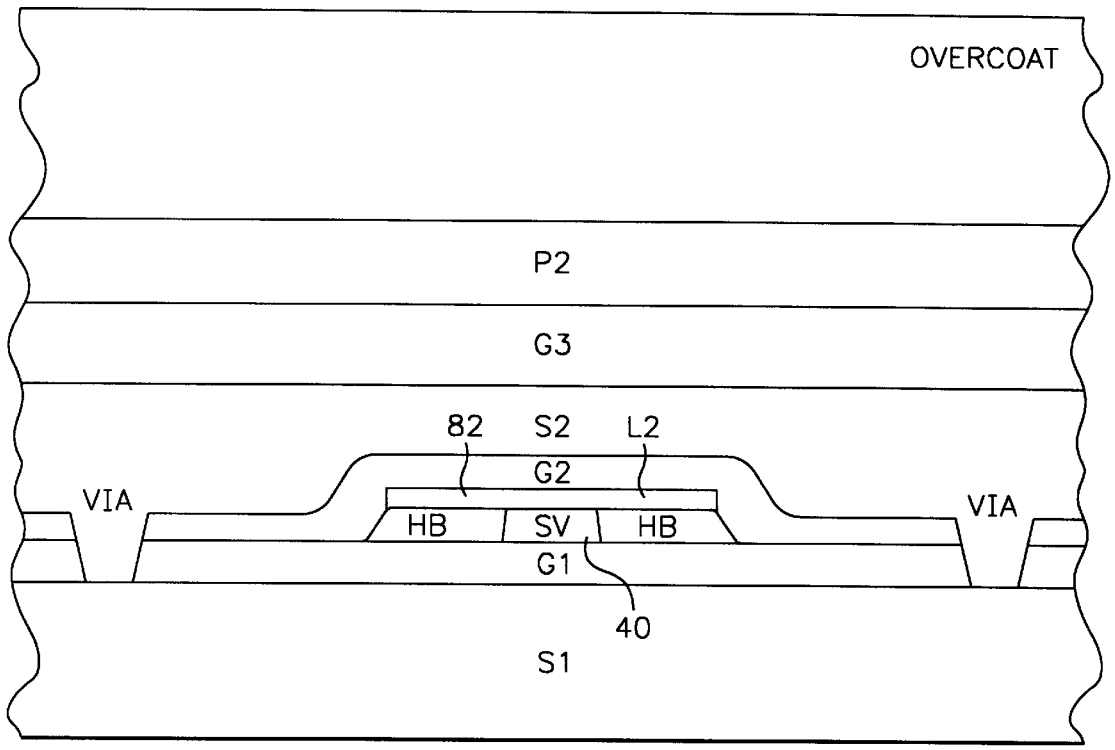
FIG. 13 is a view taken along plane XIII—XIII of FIG. 10.

As shown in FIGS. 4, 10, 11 and 13, first (L1) and second (L2) leads 80 and 82 are adjacent to and contact the first and second flux guides 60 and 62 so as to make electrical connection with bottom and top edge portions of the spin valve sensor 40 via the flux guides. The material of the flux guides may be Permalloy and the material of the first and second leads 80 and 82 may be tantalum/gold/tantalum (Ta/Au/Ta). The first and second leads 80 and 82 are also adjacent top and bottom portions of the hard bias layers 64 and 66, as shown in FIG. 10, so as to planarize the leads in these regions. Planarization of the bottom region where the first lead is located is important for planarizing the third gap layer 63, shown in FIG. 11. The leads receive a sense current ($I_S$) from the drive electronic 36 shown in FIG. 1 which is conducted through the spin valve 40 in a direction which is perpendicular to the ABS. The direction of the sense current may be from the lead 80 to the lead 82 as shown, however, the sense current could be directed in an opposite direction. Because of the perpendicular direction of the sense current the spin valve sensor is referred to as an orthogonal spin valve sensor.

When the sense current is conducted through the spin valve sensor the sensor is in an active state and is capable of detecting information field signals from the surface of the disk 24 as it rotates adjacent the ABS. The fields from the rotating disk will cause the normally parallel magnetic moment of the free layer to rotate so that it is no longer perpendicular to the magnetic moment of the pinned layer 72. The relative angle between the magnetic fields of the free and pinned layers 70 and 72 determines the resistance of the spin valve sensor. When external magnetic fields are applied to the free layer 70, the relative angle between the moments of free and pinned film changes, providing a resistance change which can be detected by the drive electronics 36 as a change in potential.

All of the layers 70, 72, 74 and 76 in the spin valve sensor are conductive layers. When the sense current $I_S$ is conducted through the AFM, free, pinned and spacer layers a magnetic field is produced about these layers according to the right hand rule. The sense current through the AFM, pinned and spacer layers induces a stiffening field 84 in the free layer, as seen in FIG. 4. This field is parallel to the ABS in the direction of the magnetic moment of the free layer in a quiescent state which results in stiffening the magnetic moment of the free layer in that direction. The stiffening of the magnetic moment of the free layer means that higher magnitude external magnetic fields are required in order to rotate the magnetic moment of the free layer relative to the ABS. This stiffening action results in a reduced sensitivity of the MR sensor as well as a reduction in its dynamic range. Accordingly, the stiffening field 84 seriously degrades the performance of the spin valve read head.

We have discovered that we can arrange the components of the spin valve read head in such a manner that the fields induced by the AFM, pinned and spacer layers 72, 74 and 76 in the free layer 70 can be completely neutralized, or at least selectively minimized. This has been accomplished by asymmetrically locating the spin valve sensor between the first and second shield layers S1 and S2. In this regard, consider the image currents 86 and 88 that are induced in the shield layers S1 and S2, respectively, by the sense current $I_S$. The magnitude of each image current is dependent upon the distance of the respective shield layer in which the current flows from the spin valve sensor. Accordingly, the closer a shield layer is to the spin valve sensor, the greater the image current. As shown in FIG. 4, the image current 86 will have a higher magnitude than the image current 88 since the first shield layer S1 is closer to the spin valve sensor than the second shield layer S2. It is these unequal distances which asymmetrically locate the spin valve sensor between the first and second shield layers S1 and S2.

The invention relies upon the fields produced by image currents 86 and 88 in the first and second shield layers S1 and S2, respectively, for opposing the stiffening field 84 induced in the free layer. Each of the image currents 86 and 88 produces a field across the spin valve sensor parallel to the ABS and to the aforementioned stiffening field 84. The image field 92 caused by the image current 88 will be parallel to the stiffening field 84 whereas the field 94 caused by the image current 86 will be anti-parallel to the stiffening field 84. When the spin valve sensor 40 is asymmetrically located between the first and second shield layers S1 and S2 by being closer to the first shield layer S1, as shown in FIG. 4, the image field 94 will be greater than the image field 92. The degree of asymmetry can be varied between that value which produces a resultant image field equal in magnitude to the stiffening field 84 to completely counterbalance the stiffening field, and some lesser value that provides a predetermined stiffness to the free layer.

The first and second gap layers G1 and G2 are generally the same thickness, usually about 0.1 $\mu$m. In order to provide additional distance between the spin valve sensor and one of the shield layers, such as the second shield layer S2, a mid-gap (MG) insulation layer 90 may be provided between the spin valve sensor and the second gap layer G2. With this arrangement the field from the image current 88 in the second shield layer S2 has less of an effect on the free layer 70 than the field from the image current 86 in the first shield layer S1. In our invention, the thicknesses of the gaps $g_1$ and $g_2$ are selected so that $H_Z$, the resultant field produced by the image fields, in the following formula is substantially zero or some predetermined value:

$$H_Z = J_F/2[(g_1-g_2)/(g_1+g_2)] + (J_S + J_P)(g_1/g_1+g_2)$$

where:

$H_Z$=the resultant field induced in the free layer;
$J_F$=the current density in the free layer;
$J_S$=the current density in the spacer layer;
$J_P$=the current density in the pinned layer;
$g_1$=the thickness of the first gap; and
$g_2$=the thickness of the second gap (G2+mid-gap).
The currents in the free, spacer and pinned layers are expressed as A/m per unit track width of these layers.

Example

Figure 14:
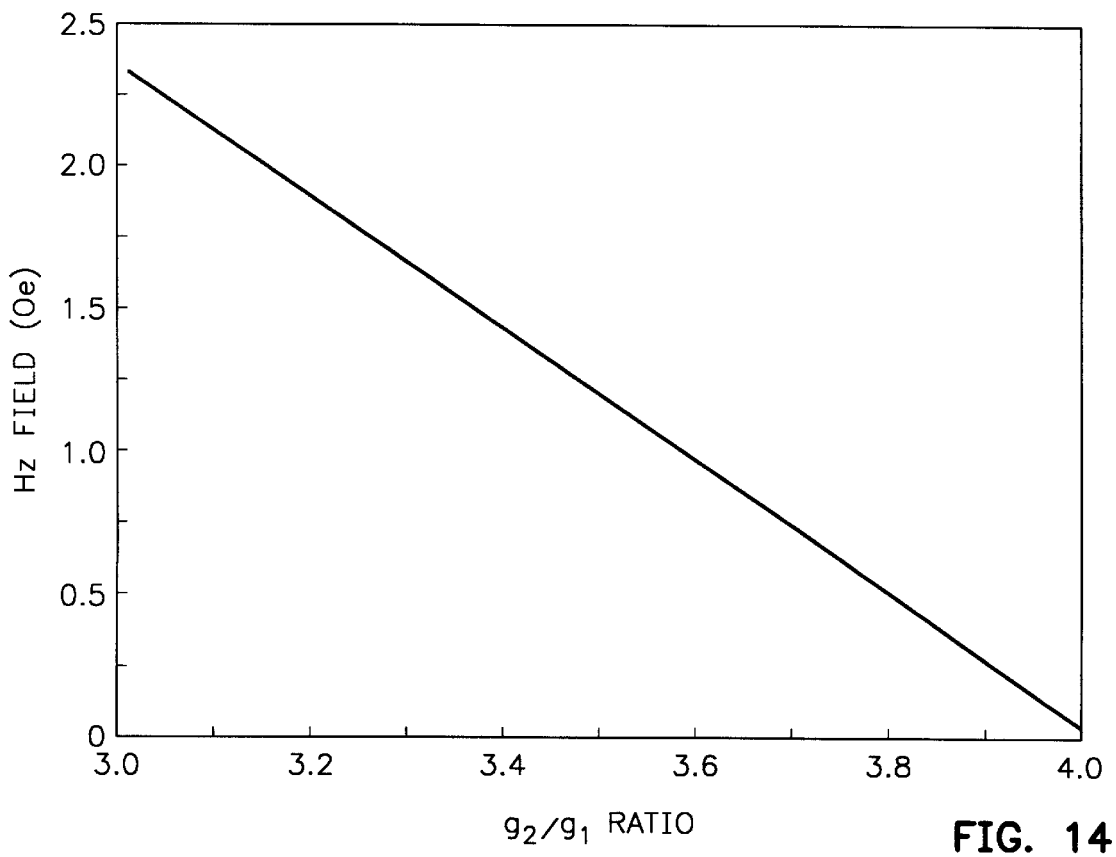
FIG. 14 is a chart illustrating field $H_2$ versus a ratio of first and second gap spacings $g_2/g_1$.

Exemplary thicknesses of the layers can be as follows:
free layer=50 Å,
pinned layer=50 Å,
spacer layer=25 Å,
first gap layer G1=0.1 $\mu$m, and
second gap layer G2=0.1 $\mu$m.
For a current density J due to the sense current $I_S=3\times10^{11}$ A/m$^2$ $J_F$=1500 A/m $J_P$=1500 A/m and $J_S$=750 A/m. With these values the ratio of the total of the thicknesses of the second gap layer G2 and the mid-gap layer 90 relative to the first gap layer G1, shown in FIG. 4, can be determined for $H_Z=0$, where there is no stiffening of the magnetic moment of the free layer, or for some value of $H_Z$ which provides a predetermined stiffening thereof. The values according to this formula are shown in FIG. 14 which shows $H_Z$ versus the ratio $g_2/g_1$. With the values given, this ratio is 4 for $H_Z=0$. Accordingly, the mid-gap layer 90 would be 0.3 μm which, when added to the thickness of 0.1 μm of the second gap layer G2, provides 0.4 μm distance between the spin valve 40 and the second shield layer S2 and only 0.1 μm between the spin valve and the first shield layer S1. These distances are measured from a center of the spin valve sensor 40 as shown in FIG. 4. Since the thickness of the spin valve sensor is negligible, the first and second gaps $g_1$ and $g_2$ in FIG. 4 are shown as 0.1 μm and 0.4 μm respectively for completely counterbalancing the stiffening field 84 caused by the sense current.

Figure 7:
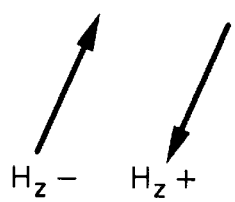
FIG. 7 illustrates directions of minus and plus fields induced into the free layer of the spin valve sensor due to a sense current through the spacer and pinned layers and due to image currents in the shield layers respectively.

FIG. 7 illustrates the opposition of the fields $H_Z$ in the free layer due to the sense current on one hand ($-H_Z$) and due to the image currents on the other hand ($+H_Z$). These fields are of opposite polarity and they will counterbalance each other (making $H_Z$ zero) when they are equal. When this occurs there is no stiffening of the magnetic moment of the free layer due to the fields from the AFM, pinned and spacer layers when the sense current is conducted therethrough.

As shown in FIGS. 10–13, the first and second gap layers G1 and G2 are provided with vias for connecting the first lead 80 to the first and second shield layers S1 and S2. Accordingly, these shield layers can then be employed as one of the leads to the drive electronics 36 for the sense current. The other lead 82 will extend to the drive electronics 36 for a return path.

Figure 5:
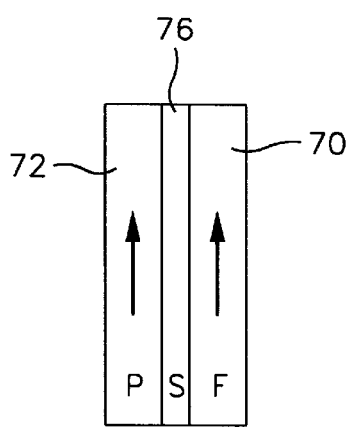
FIG. 5 is a schematic illustration of the ferromagnetic coupling field ($H_{FC}$) between the pinned and free films.
Figure 6:
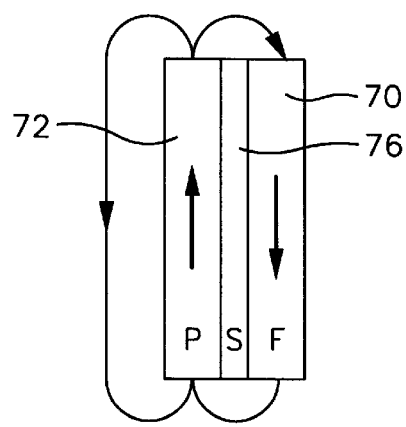
FIG. 6 is a schematic illustration of the pinned film demagnetizing field ($H_{DEMAG}$)

There are other magnetic fields acting on the free layer due to the pinned magnetic moment of the pinned layer. As shown in FIG. 5, ferromagnetic coupling produces a ferromagnetic field $H_{FC}$ in the free layer which is parallel to the magnetic moment of the pinned layer. Another field is produced external to the pinned layer due to its magnetic moment which traverses the length of the free layer, as shown in FIG. 6; this field is referred to as a demagnetizing field $H_{DEMAG}$. These fields, unlike the aforementioned fields traversing the free layer, are not generated by the sense current $I_S$. It is desirable that the ferromagnetic coupling field $H_{FC}$ and the demagnetization field $H_{DEMAG}$ counterbalance one another to again improve the sensitivity and biasing of the free layer.

Figure 8:
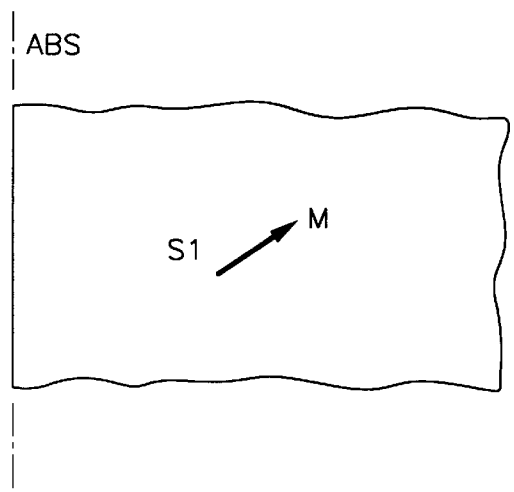
FIG. 8 is a plan view of a portion of the first shield layer.
Figure 9:
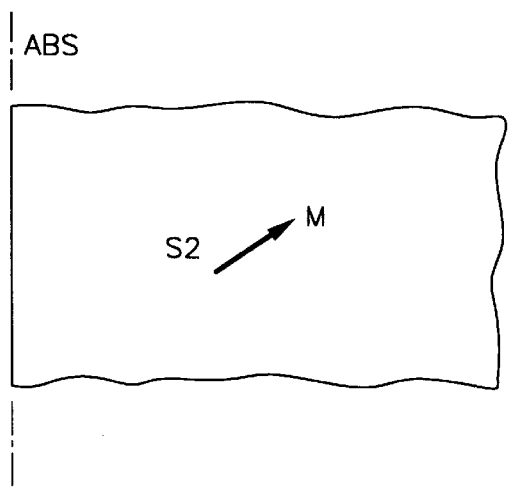
FIG. 9 is a plan view of the portion of the second shield layer.

In some embodiments it may be desirable to cant the easy axis or direction of magnetic moment of each of the first and second shield layers S1 and S2 at an angle, (such as 45°) to the ABS, as shown in FIGS. 8 and 9, in order to establish a desired permeability (say, 1000) within the shields.

It should be evident that the present invention provides a novel and unique arrangement of components for an orthogonal spin valve read head, which overcomes the problem of stiffening the magnetic moment of a free layer in the spin valve sensor due to conduction of a sense current through the AFM, pinned and spacer layers in the spin valve sensor. By selectively asymmetrically locating the spin valve sensor between the first and second shield layers, the stiffening field can be completely neutralized so as to produce no impact on the free layer; alternatively the stiffening field can be maintained at a predetermined magnitude in order to stabilize the free layer.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. An orthogonal spin valve read head comprising:

a spin valve sensor;

first and second shield layers;

leads for conducting a sense current through the spin valve sensor;

the spin valve sensor having a free layer which has a magnetic moment that is free to rotate from an easy axis in response to an external magnetic field; and the free layer of the spin valve sensor being asymmetrically positioned between the first shield layer and the second shield layer so that when the sense current is applied to the spin valve sensor freedom of the magnetic moment to rotate from the easy axis in response to the external magnetic field is enhanced.

2. A read head as claimed in claim 1 including:

first and second non-magnetic material components, each non-magnetic material component having a thickness;

the spin valve sensor being sandwiched between the first and second non-magnetic material components;

the first and second non-magnetic material components being sandwiched between the first and second shield layers;

the thickness of one of the non-magnetic material components being greater than the thickness of the other one of the non-magnetic material components so as to form said asymmetry of the free layer with respect to the first and second shield layers; and relative thicknesses of the first and second non-magnetic material components being selected to cause a counterfield which opposes a stiffening sense current field produced in the spin valve sensor in response to said sense current.

3. An orthogonal spin valve read head as claimed in claim 2 wherein each of the first and second shield layers has a magnetic moment which is directed at an acute angle to said ABS.

4. An orthogonal spin valve read head as claimed in claim 2 wherein the thickness of the second and first non-magnetic material components have a ratio $g_2/g_1$ of substantially four.

5. An orthogonal spin valve read head as claimed in claim 2 wherein:

the spin valve sensor includes an antiferromagnetic layer, a pinned layer having a magnetic moment pinned by the antiferromagnetic layer, a free layer having a magnetic moment which is free to rotate in response to an external magnetic field, and a non-magnetic spacer layer, the spacer layer being sandwiched between the pinned layer and the free layer;

the sense current being conducted through the pinned, spacer and free layers, the sense current through the pinned and spacer layers causing said stiffening sense current field and the sense current through the free layer causing an image current in each of the first and second shield layers, the image currents in the first and second shield layers producing a net image field; and the thicknesses of the first and second non-magnetic material components is selected so that said net image field substantially counterbalances said stiffening sense current field across the free layer.

6. An orthogonal spin valve read head as claimed in claim 2 wherein:

the free layer has a current density $J_F$, the spacer layer has a current density $J_S$, and the pinned layer has a current density $J_P$; and the thicknesses of the first and second non-magnetic material components being selected so that $H_Z$ in the following formula is substantially zero;

$$H_Z = J_F/2[(g_1-g_2)/(g_1+g_2)] + (J_S+J_P)(g_1/g_1+g_2)$$

where:

$H_Z$=the resultant field induced on the free layer;

$J_F$=the current density in the free layer;

$J_S$=the current density in the spacer layer;

$J_P$=the current density in the pinned layer;

$g_1$=the thickness of the first non-magnetic material component; and $g_2$=the thickness of the second non-magnetic material component.

7. A magnetic disk drive including a combined magnetic head comprising:

a frame;

a suspension mounted on the frame for supporting the combined head;

medium moving means mounted on the frame for moving a magnetic medium past the combined head in a transducing relationship therewith;

positioning means connected to the suspension for moving the combined head to a position with respect to said moving magnetic medium;

means connected to the head, the magnetic medium moving means and the positioning means for exchanging signals with the combined head, for controlling movement of the magnetic medium and for controlling the position of the combined head;

the combined head including a write head adjacent a read head;

the write head including:
an inductive coil embedded in an insulation stack;
the insulation stack and the inductive coil being sandwiched between first and second pole pieces; and
the first and second pole pieces being spaced by a third gap layer at the ABS;

the read head including:
a spin valve sensor;
first and second shield layers;
leads for conducting a sense current through the spin valve sensor;

first and second non-magnetic material components, each non-magnetic material component having a thickness;

the spin valve sensor being sandwiched between the first and second non-magnetic material components;

the first and second non-magnetic material components being sandwiched between the first and second shield layers;

the thickness of one of the non-magnetic material components being greater than the thickness of the other one of the non-magnetic material components so as to form said asymmetry of the spin valve sensor; and relative thicknesses of the first and second non-magnetic material components being selected to cause a counterfield which opposes a stiffening field produced in the spin valve sensor in response to the sense current.

8. The magnetic disk drive as claimed in claim 7 wherein each of the first and second shield layers has a magnetic moment which is directed at an acute angle to said ABS.

9. The magnetic disk drive as claimed in claim 7 wherein the thicknesses of the second and first non-magnetic material components has a ratio $g_2/g_1$ of substantially four.

10. The magnetic disk drive as claimed in claim 7 wherein:

the spin valve sensor includes an antiferromagnetic layer, a pinned layer having a magnetic moment pinned by the antiferromagnetic layer, a free layer having a magnetic moment which is free to rotate in response to an external magnetic field, and a non-magnetic spacer layer, the spacer layer being sandwiched between the pinned layer and the free layer;

the sense current being conducted through the pinned, spacer and free layers, the sense current through the pinned and spacer layers causing said stiffening sense current field and the sense current through the free layer causing an image current in each of the first and second shield layers, the image currents in the first and second shield layers producing a net image field; and the thicknesses of the first and second non-magnetic material components is selected so that said net image field substantially counterbalances said stiffening sense current field across the free layer.

11. The magnetic disk drive as claimed in claim 10 wherein:

the free layer has a current density $J_F$, the spacer layer has a current density $J_S$, and the pinned layer has a current density $J_P$; and the thicknesses of the first and second non-magnetic material components being selected $$H_Z = J_F/2[(g_1-g_2)/(g_1+g_2)] + (J_S+J_P)(g_1/g_1+g_2)$$

where:

$H_Z$=the resultant field induced on the free layer;

$J_F$=the current density in the free layer;

$J_S$=the current density in the spacer layer;

$J_P$=the current density in the pinned layer;

$g_1$=the thickness of the first non-magnetic material component; and $g_2$=the thickness of the second non-magnetic material component.

* * * * *

UNITED STATES PATENT AND TRADEMARK OFFICE
CERTIFICATE OF CORRECTION

PATENT NO.  : 5,828,530
DATED       : October 27, 1998
INVENTOR(S) : H.S. Gill

It is certified that error appears in the above-identified patent and that said Letters Patent is hereby corrected as shown below:

Column 9, line 2, change "2" to --5--.

Signed and Sealed this

Ninth Day of March, 1999

Attest:

Q. TODD DICKINSON

Attesting Officer        Acting Commissioner of Patents and Trademarks